(12) United States Patent
Serrada et al.

(10) Patent No.: US 10,786,049 B2
(45) Date of Patent: Sep. 29, 2020

(54) HOUSING FOR A BELT BUCKLE

(71) Applicant: ILLINOIS TOOL WORKS INC., Glenview, IL (US)

(72) Inventors: Jose Luis Serrada, Hamburg (DE); Eyüp Aslan, Hannover (DE); Christian Engel, Ahlden (DE); Kai Wachlin, Hohenwestedt (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 163 days.

(21) Appl. No.: 15/968,957

(22) Filed: May 2, 2018

(65) Prior Publication Data

US 2018/0325221 A1    Nov. 15, 2018

(30) Foreign Application Priority Data

May 12, 2017 (DE) .......................... 10 2017 110 345

(51) Int. Cl.
*B60R 22/00* (2006.01)
*A44B 11/25* (2006.01)
*B29C 45/16* (2006.01)
*B29L 31/00* (2006.01)

(52) U.S. Cl.
CPC ...... *A44B 11/2546* (2013.01); *B29C 45/1676* (2013.01); *B29L 2031/7274* (2013.01); *B60R 22/00* (2013.01)

(58) Field of Classification Search
CPC .................. A44B 11/2546; B29C 45/1676
See application file for complete search history.

(56) References Cited

U.S. PATENT DOCUMENTS

| 4,675,954 | A  |   | 6/1987  | Gullickson |              |
|-----------|----|---|---------|------------|--------------|
| 4,901,407 | A  |   | 2/1990  | Pandola    |              |
| 4,944,530 | A  |   | 7/1990  | Spurrier   |              |
| 6,640,400 | B1 | * | 11/2003 | Chen       | A45C 13/1076 |
|           |    |   |         |            | 190/18 A     |
| 6,701,587 | B1 | * | 3/2004  | Sato       | A44B 11/2523 |
|           |    |   |         |            | 24/633       |
| 7,240,407 | B2 | * | 7/2007  | Kawai      | A44B 11/2523 |
|           |    |   |         |            | 24/640       |
| 7,356,889 | B2 | * | 4/2008  | Alitowski  | A44B 99/00   |
|           |    |   |         |            | 24/499       |
| 8,402,617 | B2 | * | 3/2013  | Wang       | A44B 11/2523 |
|           |    |   |         |            | 24/629       |

(Continued)

FOREIGN PATENT DOCUMENTS

DE     102012009911    11/2013
WO    WO 2011092006     8/2011

(Continued)

*Primary Examiner* — Jason W San
(74) *Attorney, Agent, or Firm* — Thompson Hine LLP

(57) ABSTRACT

A housing for a belt buckle includes two housing halves, which consist of plastic material and are connected to one another, and have a plurality of connecting pins, which likewise consist of plastic material and, for the purpose of connecting the housing halves, each have a first end arranged on a first of the housing halves and have a second end inserted in each case into a mount provided on the second of the housing halves. The housing halves are each covered on the outside by a soft body, wherein the soft bodies each consist of a softer plastic material than the housing halves and the connecting pins.

11 Claims, 2 Drawing Sheets

(56) References Cited

U.S. PATENT DOCUMENTS

| | | | |
|---|---|---|---|
| 9,025,317 B2* | 5/2015 | Richardson | H04M 1/0252 |
| | | | 361/679.01 |
| 9,346,433 B2* | 5/2016 | You | B60R 22/00 |
| 9,375,609 B2* | 6/2016 | Keller | F16B 2/06 |
| 9,955,756 B2* | 5/2018 | Klafke | A44B 11/2503 |
| 2002/0085342 A1* | 7/2002 | Chen | G06F 1/1616 |
| | | | 361/679.55 |
| 2006/0255493 A1* | 11/2006 | Fouladpour | B29C 51/10 |
| | | | 264/161 |
| 2010/0203931 A1* | 8/2010 | Hynecek | A45C 11/00 |
| | | | 455/575.8 |
| 2012/0043235 A1* | 2/2012 | Klement | A45C 11/00 |
| | | | 206/320 |
| 2013/0022767 A1 | 1/2013 | Klafke | |
| 2014/0109349 A1* | 4/2014 | Blank | A44B 11/2546 |
| | | | 24/164 |
| 2016/0001309 A1* | 1/2016 | Verpoort | B05B 7/224 |
| | | | 219/76.16 |
| 2016/0007690 A1* | 1/2016 | Haas | A44B 11/2515 |
| | | | 24/682.1 |
| 2016/0242511 A1* | 8/2016 | Mangold | A44B 11/2546 |
| 2017/0167515 A1* | 6/2017 | Placzek | F16B 5/0664 |
| 2017/0172261 A1* | 6/2017 | Engel | B60R 22/00 |
| 2019/0021450 A1* | 1/2019 | Chen | A44B 11/2576 |

FOREIGN PATENT DOCUMENTS

| | | |
|---|---|---|
| WO | WO 2014106577 | 7/2014 |
| WO | WO 2014/160577 | 10/2014 |

\* cited by examiner

HOUSING FOR A BELT BUCKLE

TECHNICAL FIELD

The invention relates to a housing for a belt buckle, having two housing halves, which consist of plastic material and are connected to one another, and having a plurality of connecting pins, which likewise consist of plastic material and, for the purpose of connecting the housing halves, each have a first end arranged on a first of the housing halves and have a second end inserted in each case into a mount provided on the second of the housing halves.

BACKGROUND

The housing halves of such a housing form half-shells, and, during operation, accommodate the mechanics of the belt buckle, in particular of a vehicle such as a passenger car or truck. In the prior art, the two housing halves are connected to one another by welding, by a screwed connection, or by connecting pins made of metal or plastic material which are provided on one of the housing halves. By way of example, the use of connecting pins made of plastic material is known from WO 2014/106 577 A1. The connecting pins provided in this case on one of the housing halves are inserted into mounts which are formed on the other housing half. In order to realize both low assembly forces and high pull-off forces, the connecting pins, in particular the ends thereof which are to be inserted into the mounts, can comprise a specially adapted geometry, for example a ribbed geometry. In the prior art cited, the connecting pins can be connected to the first housing half in particular by two-component injection molding.

It is furthermore known to adhesively bonded a felt cover onto the outside of the housing after the assembly of the belt buckle and of the housing, in order to avoid undesirable rattling noises caused by the housing striking, for example, against the center console of a vehicle. This procedure is not without complex assembly and high cost. Moreover, it may be the case in practice that the adhesive felt becomes detached, such that the noise-damping action is lost. It is known from WO 2011/092 006 A1 to directly connect a further element made of a soft elastomer in an integral and/or form-fitting manner to the base body of a shell element for the buckle flap of a belt buckle, with the further element forming at least part of the outer surface of the shell element. This further element has the task of avoiding undesirable rattling noises. It is then possible to dispense with adhesive felts. In practice, soft elements of this type are connected to the respective housing half by metal pins. Particularly on account of the high assembly forces which are required, this can lead to damage, for example sites of fracture.

In principle, there is a need to form housings of belt buckles in such a manner that, in the assembled state, they have the highest possible stability and the required pull-off forces for detaching the housing halves from one another are maximized. At the same time, the visual and haptic appearance of the belt buckles should not be impaired.

SUMMARY

Proceeding from the prior art explained, the invention is therefore based on the object of providing a housing of the type mentioned in the introduction which, with a high-quality look and feel, allows for simple assembly and at the same time realizes high pull-off forces of the housing halves from one another.

For a housing of the type mentioned in the introduction, the invention achieves the object in that the housing halves are each covered on the outside by a soft body, wherein the soft bodies each consist of a softer plastic material than the housing halves and the connecting pins.

The housing halves of the housing according to the invention form half-shells, in which, in the assembled state, the mechanics of the belt buckle, for example of a vehicle such as a passenger car or truck, are accommodated in a manner known per se. Provision is made of connecting pins, which consist of plastic material and, for example, can have a cylindrical basic shape. For the purpose of connecting the housing halves to one another, the connecting pins each have a first end arranged on the first housing half and have a second end inserted in each case into a mount provided on the second housing half. Before the connection of the housing halves, the connecting pins can protrude with their second end out of the first housing half. As a result, in a further assembly step, the two housing halves can be connected to one another in a simple manner by virtue of the fact that the connecting pins protruding with their second ends out of the first housing half are inserted into the associated mounts of the second housing half. The connecting pins can consist of a different plastic material to the housing halves. The mounts of the second housing half for the second ends of the connecting pins can be part of the second housing half, i.e. can be connected to the latter in a single piece. By way of example, the second housing half, including the mounts, can be produced by injection molding. The mounts for the connecting pins can be formed in each case as blind holes. In a particularly simple manner, the second end of the connecting pins in each case can be fastened in a press fit in the respective mount of the second housing half. This gives rise to simple production and assembly and also a secure hold. To this end, the second end of the connecting pins in each case can have a ribbed surface, for example a surface ribbed in the manner of a sawtooth. As a result, the assembly forces can be reduced further and the holding forces can be increased further. As an alternative, however, it would also be possible for the connecting pins to be fastened with their second end in each case by means of a latching connection in the respective mount of the second housing half.

The housing halves are furthermore each covered on the outside by a soft body. The soft bodies each consist of a softer plastic material than the housing halves and the connecting pins. The soft bodies can completely cover the outer surfaces of the first and of the second housing halves. In principle, however, it would also be conceivable for surface portions of the first and/or second housing half to remain free of the soft body. The soft bodies result in a visually and haptically appealing appearance of the housing. Since, by way of example, the soft bodies are connected to the respective housing half by injection molding, it is possible to avoid assembly by means of metal pins which leads to problems in the prior art. A plastic material-plastic material connection is also more flexible in this respect. Moreover, especially during the molding of connecting pins made of plastic material into the first housing half, in practice to some extent surface defects arise on the outside of the first housing half. Therefore, the connecting pins or portions connecting the latter are partially visible on the outside of the first housing half, and this is unacceptable from a client's point of view. In order to avoid this, it is necessary to take complex measures during the molding of the connecting pins. According to the invention, this can be avoided in that the outside of the housing halves is covered with the soft bodies. This coverage of the outsides of the housing halves moreover leads to further design freedom, since the outsides of the housing halves are no longer visible. It is therefore possible in a targeted manner to provide for designs which, for example, increase the pull-off forces of the housing halves from one another or set the pull-off forces exactly in the desired manner, even if these additional designs affect the outer surface of the housing halves in a manner which is unacceptable to clients. This is because this outer surface is covered by the soft bodies according to the invention. In addition, it is thereby possible to increase the rigidity of the housing body, in particular of the first and second housing halves, without thereby losing installation space for the mechanical components of the belt buckle in the interior of the housing.

As already explained, the connecting pins can each have their first end molded into the first housing half by plastic injection molding. By way of example, the connecting pins can be molded into the first housing half by two-component plastic injection molding. Furthermore, the first ends of the connecting pins can each be surrounded completely by the plastic material of the first housing half.

According to a further configuration, the connecting pins can each have a head portion of enlarged cross section at their first end. Such an enlarged head portion at the first end improves the connection of the connecting pins to the first housing half, and thus the holding forces in the assembled state. Other geometries of the connecting pins, in particular of the first ends thereof, which produce an improved hold on the first housing half are also possible, however. By way of example, the geometry of the first ends of the connecting pins may be such that an undercut is produced in the material of the first housing half. The hold can be improved by virtue of interlocking in the first housing half.

The connecting pins can furthermore each have a portion of enlarged cross section between their first end and second end. This portion of enlarged cross section may be arranged between mutually facing connecting surfaces of the first and second housing halves, or for example may be molded into the first housing half. Such a cross section widened in the manner of a flange, which can circulate annularly over the circumference of the connecting pins between the first and second end of the connecting pins, leads to a particularly fixed connection of the housing halves.

As likewise already explained, the housing halves may each be encapsulated by the soft body by plastic injection molding, in particular by two-component plastic injection molding.

According to a further configuration, it can be provided that the outside of the first housing half is formed from portions of different materials, and/or that the outside of the second housing half is formed from portions of different materials, wherein the portions of different materials are concealed by the respective soft body. In this configuration, the outer surface of the first housing half and/or the outer surface of the second housing half is therefore formed from a plurality of portions which consist of different materials. In this way, a greater design freedom can be exploited, as a result of which the housing halves in turn can be adapted optimally to their intended use. At the same time, the soft body covering the surface of the first or second housing half ensures that there is a visually and haptically appealing external appearance.

According to a further configuration, at least one reinforcing rib can be arranged on the inside of the first housing half and/or the inside of the second housing half. Such reinforcing ribs increase the rigidity of the housing halves. The at least one reinforcing rib can consist of a different material, in particular a more rigid material, to the first or second housing half. By way of example, the at least one reinforcing rib can be molded onto the inside of the housing half (halves) by injection molding, in particular two-component injection molding. By way of example, the at least one reinforcing rib can extend transversely over the inside of the first housing half and/or of the second housing half. At least one reinforcing rib can be formed separately from the connecting pins. It is also possible, however, for the connecting pins to be connected to one another via at least one reinforcing rib arranged on the inside of the first housing half. The at least one reinforcing rib can then be molded together with the connecting pins into the first housing half by plastic injection molding, for example two-component plastic injection molding. The at least one reinforcing rib can form a framework, on which the connecting pins are arranged.

The connecting pins and/or the at least one reinforcing rib can then form one or more of the portions of the outside of the first housing half. In this configuration, the connecting pins and/or the at least one reinforcing rib can therefore extend as far as the outer surface of the first housing half. Since these are concealed by the soft body in the completed state, there is no visual or haptic impairment. At the same time, in this way the connecting pins and/or the at least one reinforcing rib can be provided with greater dimensions, as a result of which the pull-out forces or the rigidity are increased further.

According to a further configuration, the mounts of the second housing half for the connecting pins can be formed by inserts, which are connected to the second housing half and are made from a material which is different from that of the second housing half. The inserts can be molded into the second housing half by plastic injection molding, in particular two-component plastic injection molding. They can consist of a harder and/or more solid plastic material than the second housing half. An example of such a plastic material is ABS (acrylonitrile butadiene styrene copolymer). Inserts of this nature increase the pull-out forces further.

It is then possible in turn that the inserts form one or more of the portions of the outside of the second housing half. In this configuration, in turn, the inserts can therefore extend as far as the outer surface of the second housing half. As a result, they can in turn be provided with greater dimensions, as a result of which the pull-out forces in turn are increased. At the same time, the soft body prevents any visual or haptic impairment.

According to a further configuration, the outside of the first housing half and/or the outside of the second housing half can have at least one local unevenness, which is concealed by the respective soft body. In this respect, the outside of the respective soft body in particular does not have a local unevenness. As explained, the housing halves have a half-shell form. Local unevennesses refer to local deviations from this basic shape. By way of example, the local unevennesses may be local elevations (bulges) or local depressions (indentations), which for example can form during production of the housing halves by injection molding, for example in the region of connecting pins to be molded in or the like. Without the coverage using the soft body, the formation of such local unevennesses during injection molding would have to be prevented in a complex manner. By contrast, by virtue of the coverage of the housing halves using the soft body in accordance with the invention, the local unevennesses can easily be compensated for during the encapsulation of the housing halves with the soft body.

The soft bodies can consist of an elastomer, in particular a thermoplastic elastomer (TPE). Such a material gives rise to a particularly high-quality touch ("Soft Touch") and a particularly reliable avoidance of undesirable rattling noises.

By way of example, the housing halves can consist of polypropylene (PP). This is a particularly hard and resistant material for protecting the belt buckle.

By way of example, the connecting pins can consist of polyamide. Such a material has a particularly high strength and temperature resistance. This ensures a more secure hold of the housing halves against one another at any time. If a reinforcing rib/reinforcing ribs is/are provided, these can consist of the same material as the connecting pins.

If three different materials are used for the first housing half, the connecting pins and the soft body of the first housing half, production of the first housing half by three-component plastic injection molding is possible. If three different materials are used for the second housing half, the optionally provided inserts for the connecting pin mounts and the soft body of the second housing half, production of the second housing half by three-component plastic injection molding is correspondingly possible.

The invention also relates to a belt buckle, in particular for a vehicle such as a passenger car or truck, comprising a housing as claimed in one of the preceding claims. In a manner known per se, the belt buckle can comprise a locking mechanism arranged in the housing.

The details of one or more embodiments are set forth in the accompanying drawings and the description below. Other features, objects, and advantages will be apparent from the description and drawings, and from the claims.

BRIEF DESCRIPTION OF THE DRAWINGS

The invention will be explained in more detail hereinbelow with reference to figures. Schematically.

DETAILED DESCRIPTION

Unless stated otherwise, identical reference signs in the figures denote the same objects.

Figure 1:
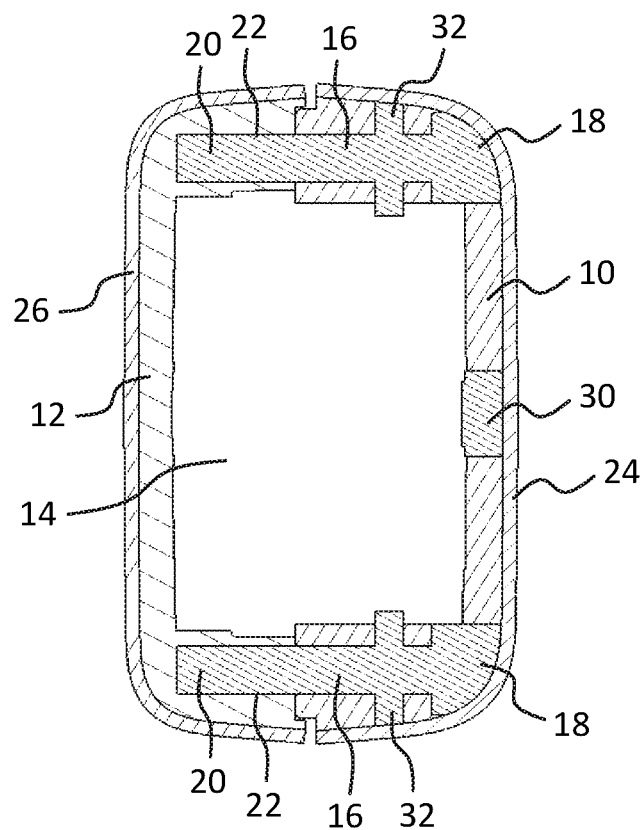
FIG. 1 shows a housing according to the invention for a belt buckle in a cross-sectional view according to a first exemplary embodiment.
Figure 3:
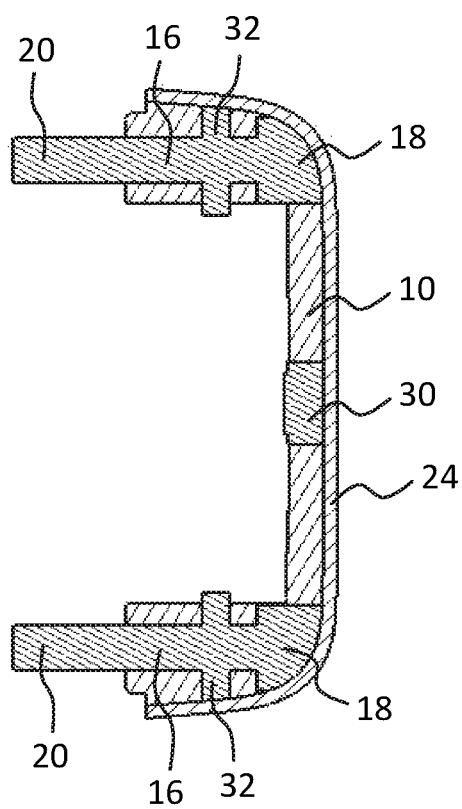
FIG. 3 shows a cross-sectional view of the first housing half of a housing as shown in FIG. 1 or as shown in FIG. 2.

The housing shown in FIG. 1 for a belt buckle of a vehicle, such as a passenger car or truck, comprises a first housing half 10 and a second housing half 12. The housing halves 10, 12 are each formed with a half-shell shape and between them delimit a space 14, in which in the fully assembled state the mechanical components of a belt buckle are accommodated. A plurality of connecting pins 16, of which two can be seen in FIG. 1, have a first end 18 held on the first housing half 10. The connecting pins 16 can consist of a different plastic material to the first housing half 10. In the example shown, the first end 18 of the connecting pins 16 forms a head portion 18, which, compared to the cylindrical basic shape of the connecting pins 16, in each case has an enlarged cross section. Moreover, the connecting pins 16 each have a free second end 20 (see FIG. 3), which lies opposite the first end 18 and is held in a cylindrical mount 22 of the second housing half 12, for example in a press fit. The mounts 22 of the second housing half 12 shown in FIG. 1 are an integral part of the second housing half 12. As can be seen in FIGS. 1 and 3, the connecting pins 16 moreover each have a portion 32 of widened cross section between their first and second end 18, 20. This portion 32 extends like a flange around the circumference of the respective connecting pin 16, and for the most part is embedded into the material of the first housing half 10. In the example shown, the first housing half 10 is moreover covered completely by a soft body 24 on the outside. In the example shown, the second housing half 12 is likewise covered completely by a soft body 26 on the outside. The soft bodies 24, 26 each consist of a softer plastic material than the first and second housing halves and also the connecting pins 16.

Figure 4:
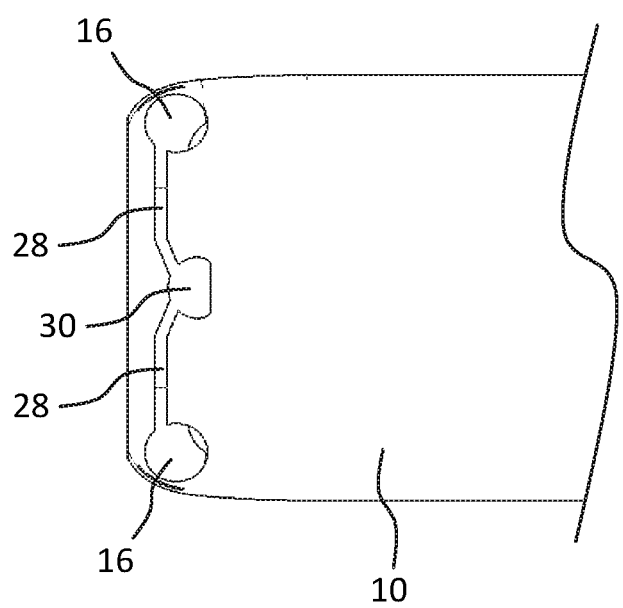
FIG. 4 shows a partial plan view onto the first housing half shown in FIG. 3, without the soft body.

The plan view shown in FIG. 4, in which the soft body 24 is not shown for reasons of illustration, shows part of the first housing half 10. It can be seen here that the connecting pins 16 are connected to one another via reinforcing ribs 28 and a gating point 30. In addition to the two connecting pins 16 shown in FIG. 4 in the plan view and in the sectional views of FIGS. 1 and 3, it is possible for example for two further connecting pins, in particular likewise connected via reinforcing ribs 28 and a gating point 30, to be formed on the opposing end (not shown in FIG. 4) of the first housing half 10. These connecting pins 16 can be formed so as to be identical in terms of their production, arrangement and configuration to the connecting pins 16 shown in the figures. Corresponding further mounts 22 for the connecting pins 16 are then provided in the second housing half 12, it being possible in turn for these mounts to be formed so as to be identical to the mounts 22 shown in FIG. 1.

For assembly, the first housing half 10 is connected to the second housing half 12 by pressing the connecting pins 20 protruding out of the first housing half 10 into the mounts 22.

It can moreover be readily seen in FIGS. 1 and 3 that the outside of the first housing half 10 is formed from portions of different materials. In particular, the connecting pins 16, specifically their first ends 18, their portions 32 and the reinforcing ribs 28 including the gating point 30, form portions of the outside of the first housing half 10. In particular, the first ends 18, the portions 32, the reinforcing ribs 28 and the gating point 30 extend as far as the outer surface of the first housing half 10. As already explained, the entire outside of the first housing half 10 is covered by the soft body 24, and therefore the different portions cannot be identified from the outside.

All of the component parts of the housing shown in FIGS. 1, 3 and 4 consist of plastic material. The first housing half 10 can be produced by plastic injection molding, in particular three-component plastic injection molding. Thus, the connecting pins 16 together with the reinforcing ribs 28 can be molded via the gating point 30 into the first housing half 10 molded from plastic material. Moreover, the first housing half 10, including the connecting pins 16 and the reinforcing ribs 28 and the gating point 30, can be encapsulated with the soft body 24. The head portions 18 of widened cross section and also the portions 32 of the connecting pins 16 are embedded into the material of the first housing half 10. The same applies to the reinforcing ribs 28 and also the gating point 30. Correspondingly, the second housing half 12 can be produced by injection molding, and in particular can be encapsulated with the soft body 26 by two-component injection molding.

Figure 2:
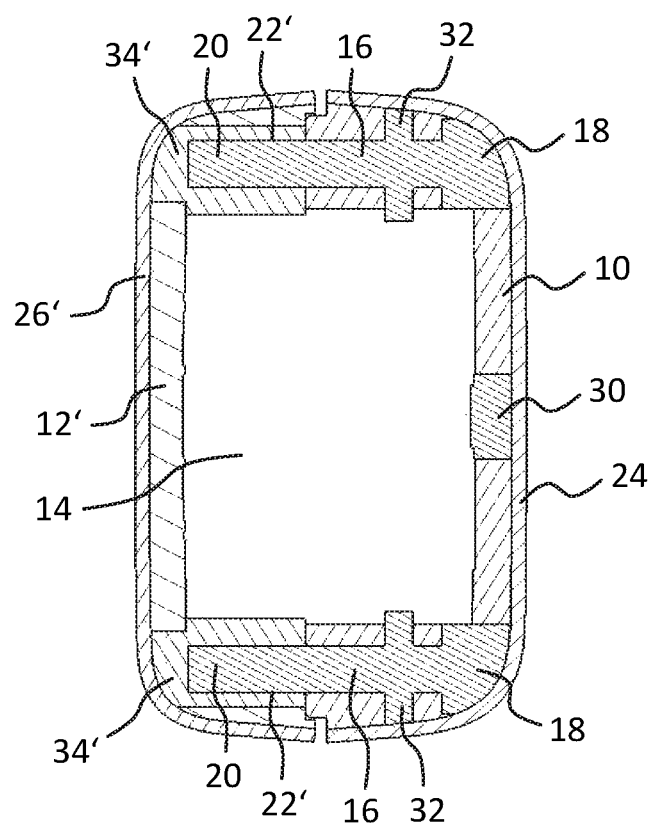
FIG. 2 shows a housing according to the invention for a belt buckle in a cross-sectional view according to a second exemplary embodiment.

FIG. 2 shows a second exemplary embodiment of a housing according to the invention. This exemplary embodiment corresponds largely to the exemplary embodiment explained with reference to FIGS. 1, 3 and 4. In particular, the first housing half 10, including the connecting pins 16, the reinforcing ribs 28 and the gating point 30 and also the soft body 24, is formed in a manner identical to the exemplary embodiment explained with reference to FIGS. 1, 3 and 4.

The exemplary embodiment shown in FIG. 2 differs from the exemplary embodiment shown in FIGS. 1, 3 and 4 merely in terms of the mounts for the connecting pins 16. Thus, in the case of the exemplary embodiment shown in FIG. 2, inserts 34' consisting of a different material to the second housing half 12' have been molded into the second housing half 12', for example by two-component plastic injection molding, these inserts forming the mounts 22' for the second ends 20 of the connecting pins 16. In the process, the inserts 34' are embedded into the material of the second housing half 12'. As can be seen in FIG. 2, the inserts 34' form portions of the outside of the second housing half 12' which consist of a different material to the other portions of the outer side. In particular, the inserts 34' in turn extend as far as the outer surface of the second housing half 12'. In turn, all of these portions are concealed by the soft body 26' which completely covers the second housing half 12'. The soft body 26' is in particular formed in a manner identical to the soft body 26. In the case of the exemplary embodiment shown in FIG. 2, the second housing half 12', including the inserts 34' and the soft body 26', is in particular made up of three different plastic materials. Correspondingly, the second housing half 12', including said components, can be produced by three-component plastic injection molding.

By way of example, the first housing half 10 and the second housing half 12 or 12' can consist of polypropylene. The soft bodies 24, 26 or 26' can consist, for example, of an elastomer, in particular a thermoplastic elastomer. By way of example, the connecting pins 16, including the reinforcing ribs 28 and the gating point 30, can consist of a polyamide. By way of example, the inserts 34' can consist of an ABS plastic material. Other materials or material combinations are of course also conceivable, however. On account of the complete coverage of the first and second housing halves 10, 12, 12', the invention allows for a large freedom of design, and therefore an optimal adaptation to the respective use.

It is to be clearly understood that the above description is intended by way of illustration and example only, is not intended to be taken by way of limitation, and that other changes and modifications are possible.

LIST OF REFERENCE SIGNS

10 First housing half
12 Second housing half
12' Second housing half
14 Space
16 Connecting pins
18 First end of the connecting pins
20 Second end of the connecting pins
22 Mount
22' Mount
24 Soft body
26 Soft body
26' Soft body
28 Reinforcing rib
30 Gating point
32 Portion
34' Insert

The invention claimed is:

1. A housing for a belt buckle, comprising a first housing half (10) consisting of plastic material and a second housing half (12, 12') consisting of plastic material, the first housing half and the second housing half connected to one another, wherein a plurality of connecting pins (16), which likewise consist of plastic material for the purpose of connecting the first housing half and the second housing half, each have a first end (18) arranged on the first housing half (10) and have a second end inserted in each case into a mount (22, 22') provided on the second housing half (12, 12'), wherein each of the first housing half and the second housing half includes an inner first plastic material protecting a belt buckle, with an outer second plastic material molded as a soft body to the outside of the inner first plastic material in an integral and non-removable connection to the inner first plastic material, wherein the outer second plastic material on each of the first housing half and the second housing half is a softer plastic material than both the inner first plastic material and the plastic material of the connecting pins (16).

2. The housing as claimed in claim 1, wherein the connecting pins (16) each have their first end (18) molded into the first housing half (10) by plastic injection molding.

3. The housing as claimed in claim 2, wherein the connecting pins (16) each have a head portion (18) of enlarged cross section at their first end (18).

4. The housing as claimed in claim 3, wherein the connecting pins (16) each have a portion (32) of enlarged cross section between their first end (18) and second end (20).

5. The housing as claimed in claim 1, wherein at least one reinforcing rib (28) is arranged on the inside of the first housing half (10) and/or the inside of the second housing half (12, 12').

6. The housing as claimed in claim 5, wherein the connecting pins (16) are connected to one another via at least one reinforcing rib (28).

7. The housing as claimed in claim 6, wherein the connecting pins (16) and/or the at least one reinforcing rib (28) form/forms one or more of the portions to which the outer second plastic material is molded.

8. The housing as claimed in claim 1, wherein the the outer second plastic material forming each soft body is a thermoplastic elastomer.

9. The housing as claimed in claim 8, wherein, in the case of each of the first housing half and the second housing half, the inner first plastic material is polypropylene.

10. The housing as claimed in claim 9, wherein the connecting pins (16) consist of polyamide.

11. A belt buckle, for a vehicle, comprising a housing as claimed in claim 1.

* * * * *